United States Patent
Scharrenberg

[11] Patent Number: 6,126,769
[45] Date of Patent: Oct. 3, 2000

[54] FILM LAMINATED PLASTIC MOULDING AS WELL AS PROCESS AND DEVICE FOR ITS MANUFACTURE

[75] Inventor: Alfred Scharrenberg, Kongen, Germany

[73] Assignee: Otto Deuschle Modell-und Formenbau GmbH & Co.

[21] Appl. No.: 09/193,952

[22] Filed: Nov. 18, 1998

Related U.S. Application Data

[62] Division of application No. 08/682,062, Jul. 16, 1996, Pat. No. 5,928,464, which is a division of application No. 08/403,529, Mar. 13, 1995, abandoned.

[51] Int. Cl.[7] ................................................ B32B 31/00
[52] U.S. Cl. ........................ 156/156; 156/285; 264/545
[58] Field of Search .................................. 156/156, 285; 264/79, 82, 523, 545, 546, 241, 248, 257, 259, 265, 279, 900, 904, 45.2, 46.5

[56] References Cited

U.S. PATENT DOCUMENTS

| | | | |
|---|---|---|---|
| 4,131,664 | 12/1978 | Flowers et al. | 264/510 |
| 4,824,504 | 4/1989 | Kagata | 156/216 |
| 4,923,539 | 5/1990 | Spengler et al. | 156/79 |
| 4,968,474 | 11/1990 | Ito | 264/513 |
| 4,978,407 | 12/1990 | Ardissone | 156/216 |
| 4,992,224 | 2/1991 | Swenson et al. | 264/46.6 |
| 5,277,865 | 1/1994 | Hara et al. | 264/516 |
| 5,429,786 | 7/1995 | Jogan et al. | 264/255 |

FOREIGN PATENT DOCUMENTS

| | | |
|---|---|---|
| 0 451 447 | 10/1991 | European Pat. Off. . |
| 0 475 198 | 3/1992 | European Pat. Off. . |
| 0 502 606 | 9/1992 | European Pat. Off. . |
| 41 27 241 | 2/1993 | Germany . |
| 42 35 769 | 4/1994 | Germany . |
| 84/01352 | 4/1984 | WIPO . |
| 94/01267 | 1/1994 | WIPO . |

*Primary Examiner*—Francis J. Lorin
*Attorney, Agent, or Firm*—Young & Basile, P.C.

[57] ABSTRACT

A plastic moulding includes a rigid support (32) which is joined over at least one surface area (27, 29) to at least one film (5', 5"). The film (5', 5") has a fold at the edge of the plastic moulding which is placed around the plastic support. The manufacture of this plastic moulding (35) takes place such that first of all the film (5', 5") is brought into the final shape including the final fold and that only thereafter is the material of the plastic support (32) applied to the plastic film (5', 5") as a melt and both pressed into the completed fold and also collectively brought into the final shape by a compression moulding process (FIG. 7).

9 Claims, 8 Drawing Sheets

FILM LAMINATED PLASTIC MOULDING AS WELL AS PROCESS AND DEVICE FOR ITS MANUFACTURE

This application is a division application of Ser. No. 08/682,062 filed Jul. 16, 1996 now U.S. Pat. No. 5,928,464 which is a division application of Ser. No. 08/403,529 filed on Mar. 13, 1995, now abandoned.

The invention concerns a film laminated plastic moulding which includes a rigid plastic support and a film which is joined to at least one surface area of the plastic support and where the film exhibits a fold round the plastic support on at least one edge, as well as a process and device for its manufacture.

Many large surface plastic mouldings, e.g. panelling on the inside of doors or seat back panelling for automobiles are covered completely or in certain areas with a decorative film on visual grounds. The decorative film must be applied with a "fold", which preferably extends to 180°, around the edges of the plastic moulding. PVC covering fabrics with PP foam or else knitted fabrics based on PET with PP foam are particularly worth considering. The material of the rigid support consists predominantly of PP (possibly modified with talc).

Known plastic mouldings of the type mentioned at the start are manufactured in the following manner: first of all the rigid plastic support is injected into a suitable press. The main surfaces of the completed plastic support are then covered with the film in which first of all a film edge projects at the margins. These edges—which are if needed supplied with suitable incisions on the bends—are finally placed around the plastic support and stuck on by hand by which means the necessary fold is formed. This known manufacturing process is not only dear since it requires manual labour. It is furthermore also no longer desirable on environmental grounds on account of the adhesive which is used.

It is therefore the task of the present invention to create a film laminated plastic moulding of the type specified at the start which can be manufactured economically and with a sorted plastic without the use of an adhesive.

This task is solved according to the invention in that the plastic support is a body that is pressed into the fold of the film in the melt and then solidified.

Thus, according to the invention, the manufacture of the film laminated plastic moulding proceeds quite differently from what was the case in the Prior Art: first of all the plastic film is brought into that form which it adopts—inclusive of its fold—in the finished plastic moulding. Then the material of the plastic support is applied in a suitable manner to the film thus prepared; pressed into the area of the fold and thus incidentally also brought into that form which the plastic moulding should finally possess. The preforming of the film required in this connection may easily be effected; the use of an adhesive is rendered superfluous by the later application of the melt of the plastic support on the film; sorted plastics can be used.

In many cases plastic mouldings of the type which is here of interest include several fields which are separated from one another by separation seams. The surfaces of the individual fields are then fashioned differently. For example one of these fields can later be painted whilst one or several of these fields are possibly provided with different films on the visible side.

A plastic moulding of this type can also include a foam padding arranged between the film and the plastic support.

It is further the task of the invention to indicate a process for the manufacture of a film laminated plastic moulding of the type mentioned at the start which can be carried out economically and without the use of adhesives.

This process distinguishes itself in that
   a) the film is first brought into a form which already corresponds to that which it has in the finished plastic moulding including the fold;
   b) only then is the melt of the material which forms the plastic support applied to the ready formed film and its fold and allowed to solidify there.

The advantages of the process according to the invention correspond in summary to those explained above for the plastic moulding according to the invention.

According to a preferred implementation, the process according to the invention distinguishes itself in that one or more melt cakes of the melt are firstly applied in a laminar flow process to the already formed film and moulded in a subsequent compression process into the final plastic support. The introduction of the melt cake takes place through this laminar flow process with the least possible application of force to the film which should of course not be disturbed any more during this course of events.

As has already been mentioned, certain plastic mouldings should have integrated foam padding. For manufacture of plastic mouldings of this type, an implementation of the process according to the invention is recommended in which
   a) the foam padding is fixed to the film;
   b) the foam padding is temporarily reinforced by the injection of a gas during the introduction of the melt of the material forming the plastic support.

By this means a situation is arrived at in which the melt which is applied to the foam padding and which surrounds it does not, during the moulding into the final form of the plastic support, compress the foam padding by which this would lose its pliability. The gas introduced in to the foam padding on the contrary builds up a counter pressure which opposes the pressure of the melt in the moulding process and prevents any compression of the foam padding. Once the moulding process is complete and the plastic material is rigid, the gas can again be released from the foam padding through which it regains its elasticity.

Inasmuch as the plastic moulding which is to be manufactured exhibits a strongly profiled surface, an implementation of the process is recommended in which
   a) the film is brought into approximately its final form in a first deep draw step;
   b) the pre-drawn film is introduced into a mould cavity which corresponds to the shape of the plastic moulding which is to be manufactured and in this is brought into the final shape by application on to the mould cavity wall before the melt of the material forming the plastic support is applied.

The first step in the process thus takes place in a separate mould whilst the second step in the process takes place in that device in which the final plastic moulding ensues through injection of the plastic carrier.

It is further the task of the present invention to create a device with which the plastic moulding mentioned at the start can be manufactured economically and without the use of adhesives.

This task is solved according to the invention in that the device includes:
   a) a matrix in which a mould cavity is formed which partially imitates the shape of the plastic moulding which is to be manufactured;
   b) means which serve for the application of the film inserted into the mould cavity onto the wall of the mould cavity;

c) a heating apparatus with which an edge of the film which projects over the mould cavity of the matrix may be heated;

d) at least one outer slide whose inner edge reproduces the outer half of the edge of the plastic moulding which is to be manufactured and which may be transported laterally from outside against the projecting edge of the film;

e) at least one inner slide, whose outer edge reproduces the inner half of the edge of the plastic moulding which is to be manufactured and which may be transported laterally from inside against the projecting edge of the film;

f) at least one nozzle via which the melt of the material forming the plastic support can be applied to the film laid on the mould cavity of the matrix;

g) a compression moulding apparatus with which the melt can be pressed into the fold of the film and the plastic support can be brought into its final shape lying at least partly on the film.

Central elements of the device according to the invention are thus the outer and inner slides which together preform the at first unshaped film edge which projects over the mould cavity of the matrix into a fold which corresponds to the final shape of the fold in the completed plastic moulding. The heating apparatus of the device according to the invention thus heats the projecting edge in such a way that it can easily be brought into the desired shape by the two slides.

The means for laying the film onto the mould cavity in the matrix preferably include a vacuum apparatus with channels which open out onto the mould cavity. When the vacuum apparatus starts functioning, the space between the inserted film and the wall of the mould cavity is evacuated through which the film lies tightly on the wall of the mould cavity.

It is correspondingly also recommended that the vacuum apparatus be joined to the area of the film fold via the vertical and horizontal partition surfaces between the outer slide and the inner slide and the parts adjoining them. In this manner the projecting edge of the film which has already been preformed into the fold by the outer and inner slides is fully applied onto the suitably contoured edges of outer and inner slides with the help of the partial vacuum produced by the vacuum apparatus.

Advantageously, the nozzle should be a heated and controlled needle valve nozzle. Needle valve nozzles of this type are in themselves already known and therefore need not be further explained here.

In a preferred implementation form of the invention, the heating apparatus is formed as a movable heating frame with a heating coil which may be transported into a position which is parallel to the inner surface of the film edge which protrudes over the mould cavity of the matrix. The heating apparatus is only brought into this position for a short time and then removed from the area of the film edge at a suitable time in coordination with the movements of the outer and inner slides.

The movement of the outer slide can usefully be controlled in that the outer slide may be moved by at least one guide pin which is fixed diagonal to a vertically moving press top part and which penetrates a through bore in the outer slide which runs diagonally at the same angle. The vertical movement of the press top part with which the closing of further mould parts is effected is converted in this manner into a corresponding lateral movement of the outer slide which is correlated in terms of time.

The lateral movement of the inner slide should usefully be accompanied by a movement directed perpendicular to it onto the free rim of the film edge. The bending back of the film edge into an fold is facilitated by this combined motion.

The moulding apparatus can include a pressure plate which is arranged movably in a recess of a mould ring whereby the mould ring is itself movable and imitates part of the shape of the plastic moulding to be completed with its outer surface which faces the mould recess. In this case after closing of the outer and inner slides the mould ring is first of all displaced in the direction of the matrix such that together with the matrix and the corresponding outer zones of the outer and inner slides it already defines to a great extent the finished form of the plastic moulding to be manufactured, although however the area of the pressure plate is still excluded which will only be pushed forward in a further function step. The melt cake which has been applied to the film is then pressed by this into the mould and thereby in particular also into the fold of the film by which the mould in which the rigid plastic support ensues is completely closed.

For manufacture of plastic mouldings with integrated foam padding an implementation is recommended in which an injection needle is provided which may be transported into the mould cavity and via which gas under pressure can be supplied to foam padding which has been applied to the film. The reason for this measure has already been explained above.

For manufacture of film laminated plastic mouldings which include several fields which are separated from one another by separation seams, an implementation of the device according to the invention is preferably used which distinguishes itself in that a) a punch is provided which may be driven through the matrix into the mould cavity and which outlines the shape of the separation seam;

b) on a pressure plate which forms the moulding apparatus a multiplicity of protruding lugs are formed parallel to the course of the punch against which the punch may be laid.

The punch thus on the one hand stamps out the desired clear-cut separation seams and on the other hand serves in the final phase of the moulding process for the plastic support, and particularly during its solidification, for clipping of the edge of the film located here to the pressure plate in cooperation with the lugs.

Additionally, a device according to the invention can include a laterally transportable slide which imitates with an area of its outer contour a hook like projection which serves for clipping of the plastic moulding.

The laterally movable slide may additionally be transported vertically together with at least one ejector. It may then take over the function of an ejector.

A useful implementation provides that the laterally movable slide includes a punch which is introduced into an essentially vertically movable part such that the vertical motion of this part is converted into a lateral movement of the slide.

Implementation examples of the invention are further clarified below by means of the illustrations which show

Figure 1:
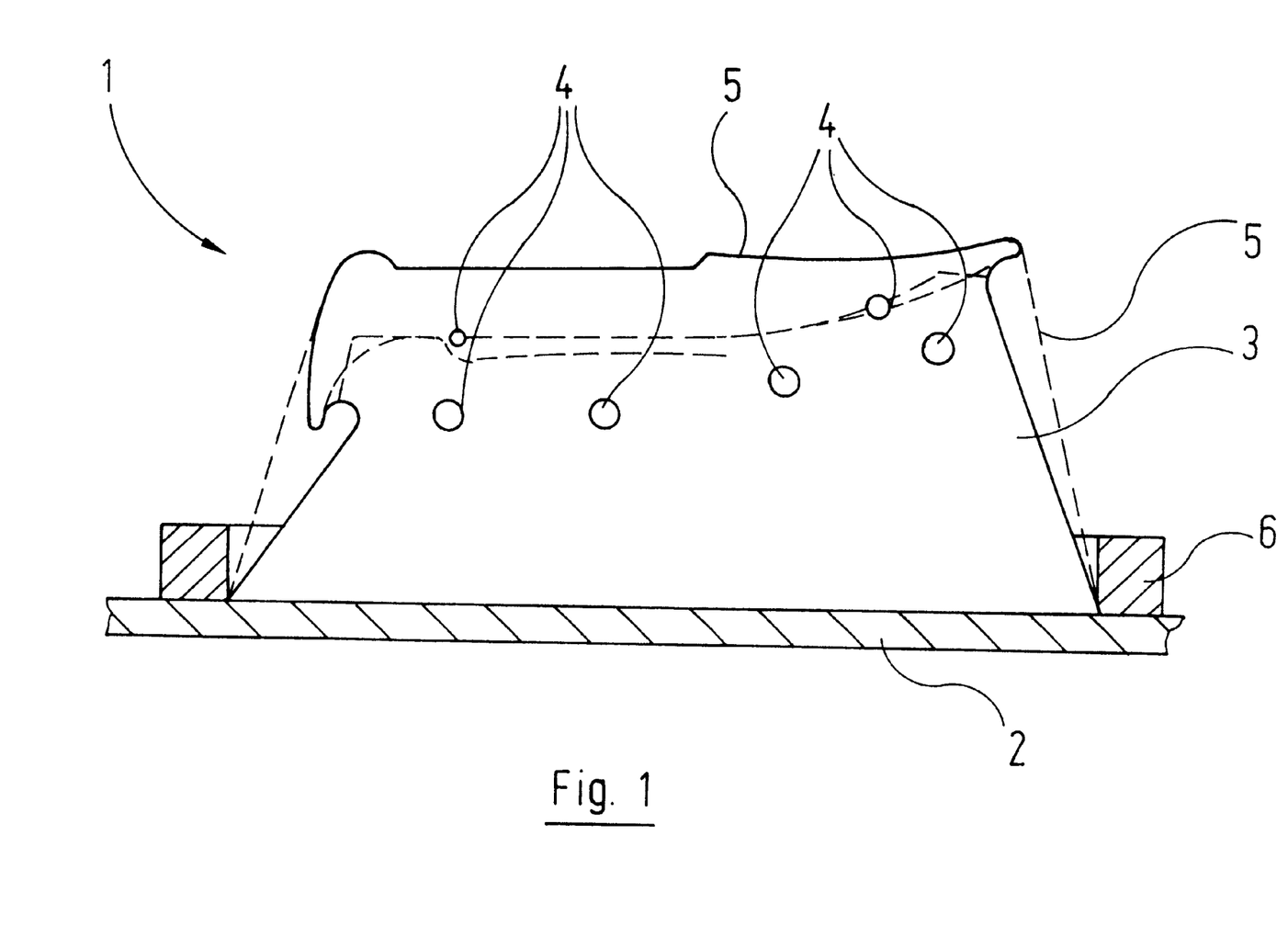
FIG. 1: schematically a deep draw device in a side view as may alternatively be used for manufacture of plastic mouldings with high thermoforming ratio.

Reference is first of all made to FIG. 1. This shows a deep draw device as may alternatively be used in manufacture of film laminated plastic mouldings with particularly strong profiling. This device, which is indicated in its entirety by the reference number 1, includes a preforming tool 3 arranged on the base plate 2 which is penetrated by several vacuum channels 4 that open out onto the surface. The outer contours of the preforming tool 3 correspond in the upper area to the outer contours of the plastic moulding which is to be manufactured, taking into consideration where necessary an experimentally determined pre-embossing.

The film itself is provided with the reference number 5 in FIG. 1. It is placed with suitable pre-heating over the outer contour of the preforming tool 3 and fixed to the base plate 2 by a supporting frame 6. It thus first of all extends itself, as shown by the dashed line, below the uppermost contour of the preforming tool and at a distance from it.

At this point, the gap between the film 5 and the preforming tool 3 is evacuated via the vacuum channels 4. By this means the preheated film lies fully on the lateral surfaces of the preforming tool. After cooling, the film 5 which is to be laminated onto the plastic moulding is cut out with the requisite edge which serves as the inverted rim by a suitable integrated punch knife which is not shown in FIG. 1. The result is a film 5 which, with appropriate pre-embossing if necessary, already exhibits essentially that contour which it will adopt in the later, completed plastic moulding, although still having a straight edge as a turned-up rim.

This first manufacturing step depicted in FIG. 1 can be omitted in those plastic mouldings whose profiling is slight and where the thermoforming ratio of the film is correspondingly small.

The film 5 thus prepared and cut out is at this point brought into a device as is partly depicted in FIGS. 2 to 5. This device, which in its entirety bears the reference number 7 essentially involves a specially modified vertical press with suitable plastication and injection units. Only those areas of the device are shown which have undergone appropriate adaptation for manufacture of the plastic moulding.

The manufacturing device 7 includes a stationary matrix 8 which is fixed to a base plate 9. A mould cavity 10 is incorporated into the matrix 8 and essentially corresponds to the external contour of the plastic moulding which is to be manufactured. Several vacuum channels 11 run through the matrix 8 and serve, as is explained later in detail, for evacuation of the space between the matrix 8 and the film 5 which is to be laid into it.

On the top part of the mould 12 which may be moved vertically with respect to the matrix 8 several diagonal guide pins 13 are fixed whose lower ends mesh with corresponding diagonal through bores 14 of an outer slide 15.

The outer slide 15 may be displaced horizontally on the upper side of the matrix 8. It exhibits on its inner edge 36, which faces the mould cavity 10, a contour which corresponds to the outer half of the rounded off rim of the plastic moulding which is to be manufactured.

On the mould top part 12 is furthermore fixed a heating frame 38 which may be moved in a vertical direction relative to the mould top part 12 (cf. arrow 16) by means of a cylinder 39. The heating frame 38 bears an electrical heating coil 17.

The vertical motion of the mould top part 12 is furthermore carried out together with an inner slide 18 and a mould ring 19 arranged under the inner slide 18.

The inner slide 18 is additionally displaced outwards by a suitable actuating device, which is not depicted in the illustration. On its outer edge 20 it possesses a contour which corresponds to the inward pointing half of the plastic moulding which is to be completed in its edge region. The mould ring 19 has an outer contour which corresponds to the inner contour of the plastic moulding which is to be manufactured in that same area of the ring which closes directly on the area of the edge corresponding to the edge 20 of the inner slide 18.

A pressure plate 22 is arranged in an inner recess 21 of the mould ring 19 so as to be vertically displaceable. Actuation takes place hydraulically via a pressure rod 23.

The lower ends of a number of heated and controlled needle valve nozzles 24, of which only one is depicted in the illustration, are fixed in the pressure plate 22. The construction and direction of needle valve nozzles of this type are well known in themselves and need not be further clarified here.

Figure 2:
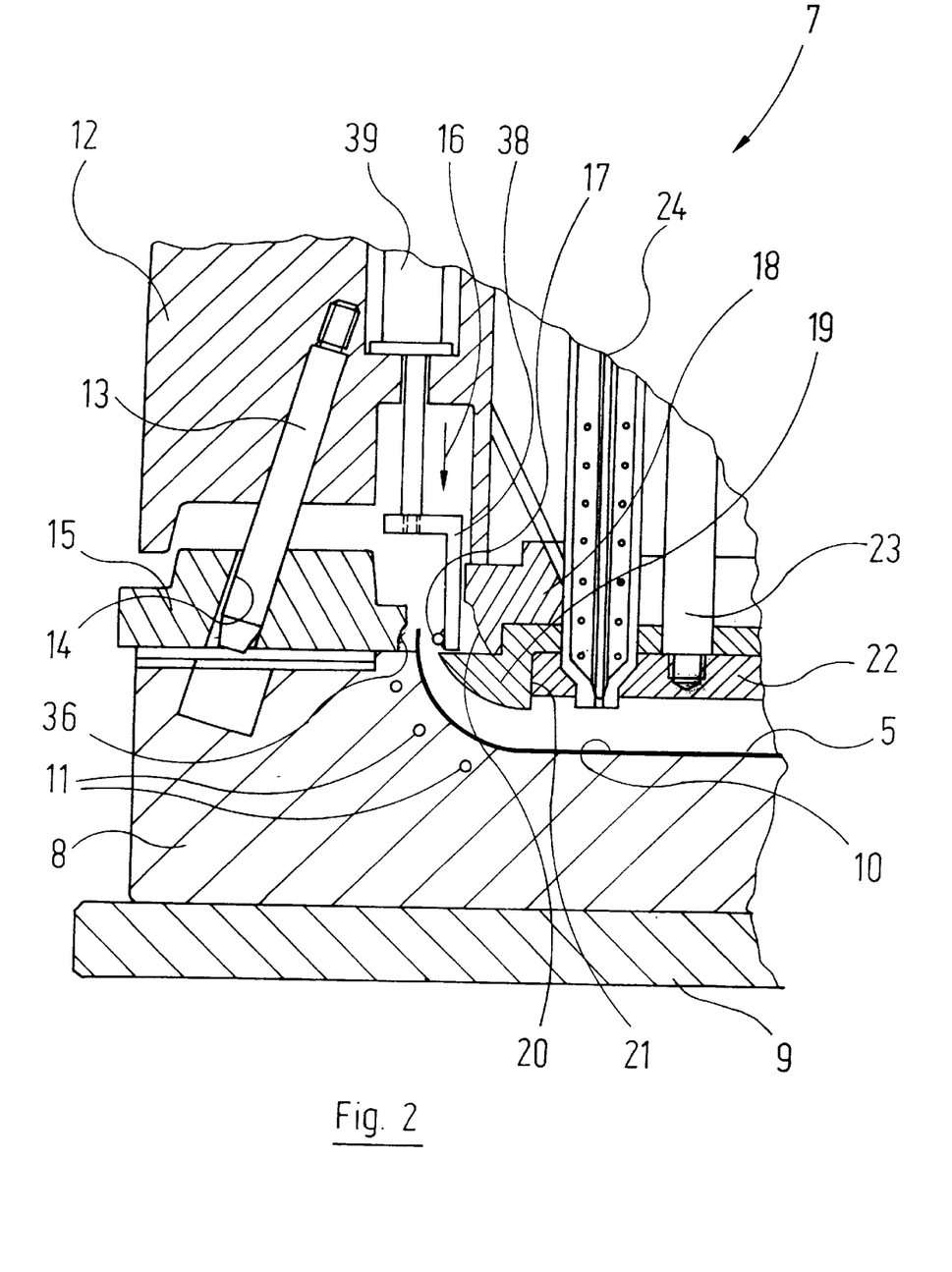
FIGS. 2 to 5: partial section through a first implementation example of a device for manufacture of film laminated plastic mouldings at different stages of the manufacture.
Figure 3:
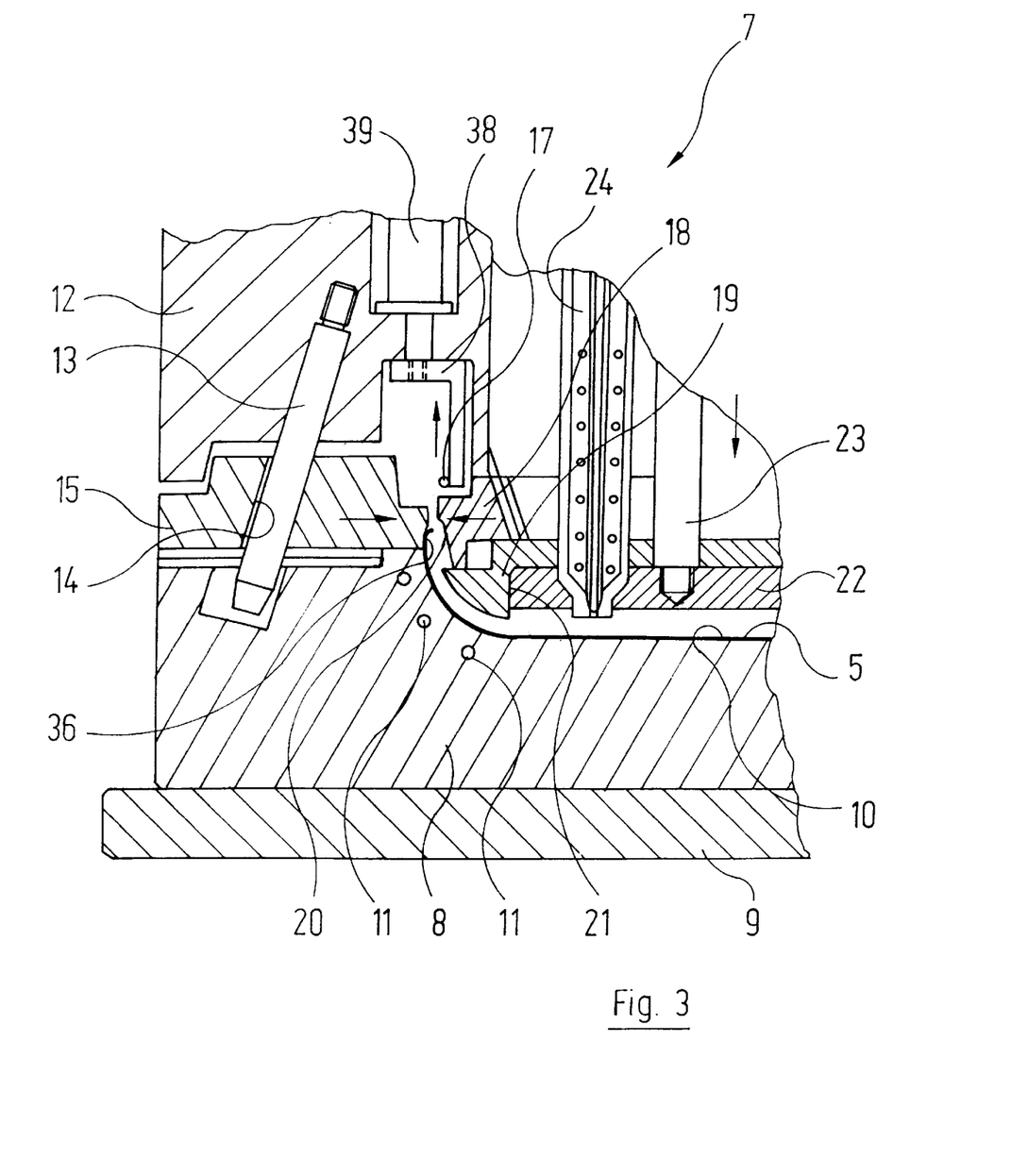

The mode of functioning of the device 7 described above is as follows:

The film 5 preformed in the deep draw device according to FIG. 1 is, as may be seen from FIG. 2, laid into the mould cavity 10 in the matrix 8 in such a way that its edge, which later forms the fold, projects above the matrix 8. The mould top part 12, just like the inner slide 18, the mould ring 19 and the pressure plate 2 is located at a distance vertically above the outer slide 15 and the matrix 8. In this position, the outer slide 15 is at the same time shifted outwards a little. After laying in of the preformed film 5 the gap between the film 5 and the mould cavity 10 of the matrix 8 is impinged upon by the vacuum channels 11 in such a way that the film 5 lies fully and flat over the mould cavity 10 of the matrix 8.

At this point, the mould top part 12 travels into an intermediate position in which a gap of around 50 mm lies between it and the upper side of the outer slide 15. In this relative position the heating frame 38 is transported at lightning speed by means of the cylinder 39 into the position depicted in FIG. 2 in which the electrical heating coil 17 stands facing the edge of the film 5 at a small distance. By passing a current through the heating coil 17 the inwards pointing surface of the film is heated up in the area of the edge such that this may be worked easily. At this point the heating frame 38, actuated by the cylinder 39, travels back upwards; at the same time the mould top part 12 moves downwards. This downwards directed motion of the mould top part 12 is converted by the guide pins 13 into an inwards directed motion of the outer slide 15. This finally reaches the position depicted in FIG. 3 in which its edge 36 joins flush to the mould cavity 10 of the matrix 8. The edge of the film 5 is thereby already turned over as may be inferred from FIG. 3. It may also be discerned from this that the edge 20 of the inner slide 18 still has a gap sideways and upwards between it and the edge of the film 5.

Figure 4:
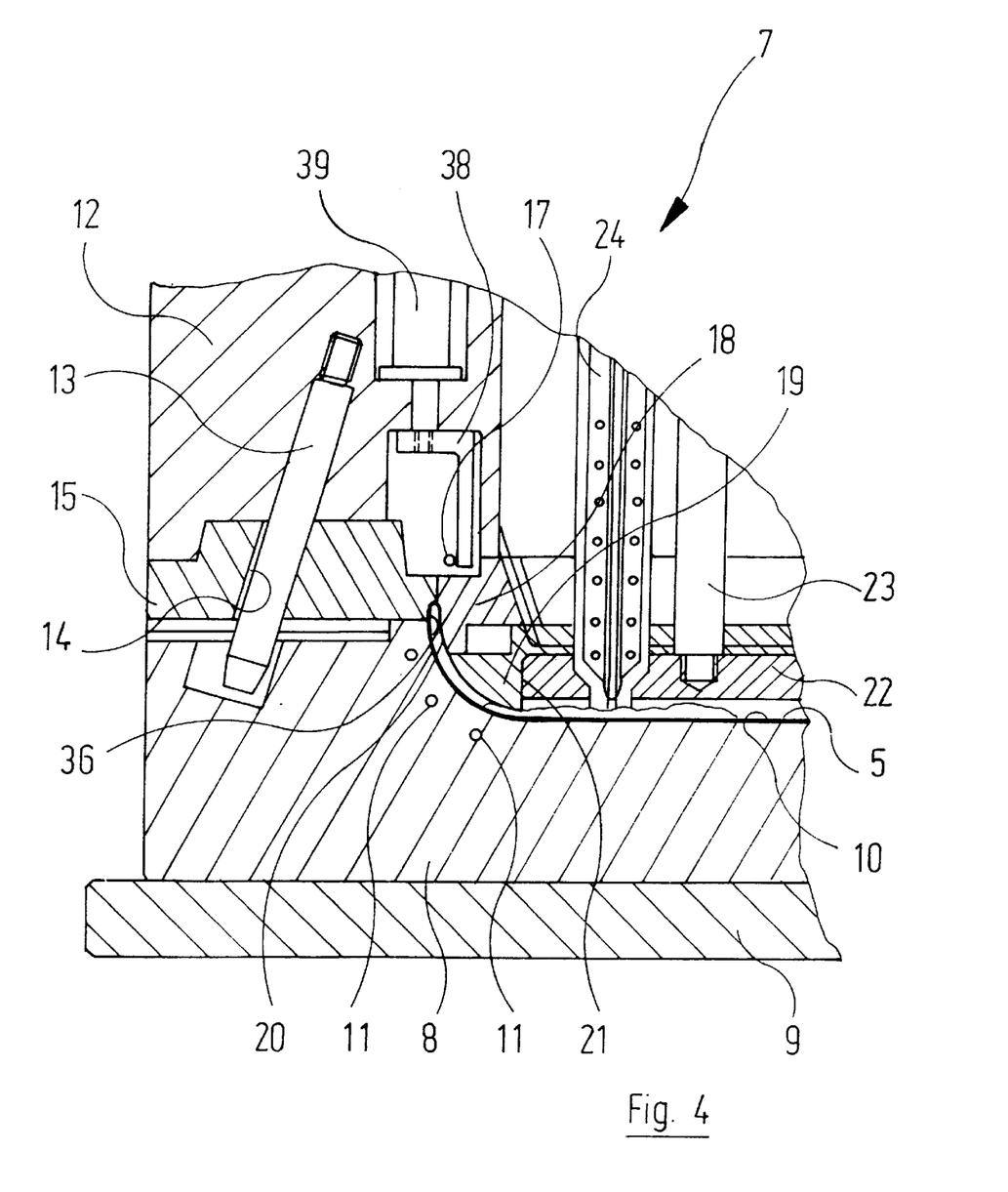

In a further step, which is depicted in FIG. 4, the mould closes completely whilst the mould top part 12 moves downwards until it is lies on the upper surface of the outer slide 15. This movement is participated in by the inner slide 18 which is simultaneously shifted outwards by its actuating device, not depicted in the illustration, until its outer end wall lies against the inner end wall of the outer slide 15. The shaped edge 20 of the inner slide 18 thus turns over the edge of the film 5 completely as may be inferred from FIG. 4. Shortly before the outer and inner slides 15 and 18 respectively attain their end positions the edge of the film 5 is forced by a vacuum over the horizontal and vertical slide divisions and laid in this manner onto the edges 20 of outer slide 15 and inner slide 18. The air moved by this furthermore serves to cool the heating coil 17.

The mould ring 19 has moved simultaneously with the mould top part 12 and the inner slide 18 into that position in which it is a part of an injection mould for the plastic moulding which is to be manufactured. The pressure plate 22 still has, though, as FIG. 4 makes clear, its vertically upward withdrawn position inside the recess 21.

At this point, as is likewise depicted in FIG. 4, the plastic melt is sprayed without pressure onto the plastic film 5 by means of the needle valve nozzles 24 by a laminar flow process, similar to injection, whilst taking care that the distribution of the melt cakes corresponds roughly to the component geometry.

Figure 5:
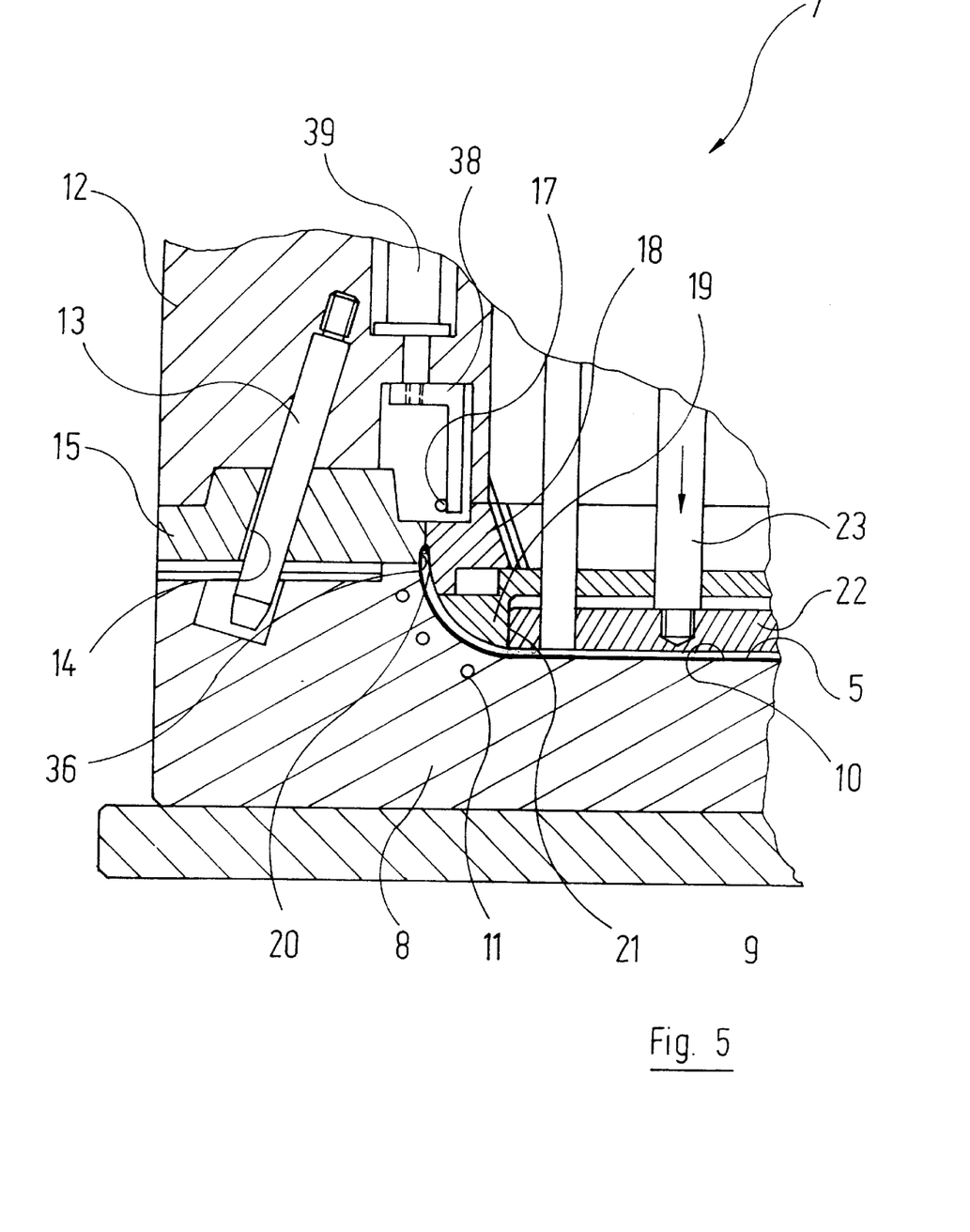

In a subsequent step, which is depicted in FIG. 5, the pressure plate 22 is pushed fully downwards by the pressure rod 23 by which the complete injection mould for the plastic moulding to be prepared arises. The melt cake is simultaneously pressed into those areas of the injection mould which are limited on the one side by the plastic film 5 including its fold which lies on outer slide 15 and inner slide 18 and on the other side by the inner slide 18 and the mould ring 18.

After the moulding process, the mould top part 12 together with inner slide 18, mould ring 19 and pressure plate 22, which is furthermore withdrawn upwards within the recess 21, travels vertically upwards back into the starting position by which the outer slide 15 is again driven outwards. The completed and cooled plastic moulding, coated with the film 5, is then removed from the device by a suitable ejector.

In the description of the device which is depicted in the FIGS. 2 to 5, it is assumed that the plastic moulding which is to be manufactured is to be provided in its entirety with a film to be laminated and a fold on the edges. There are, however, also plastic mouldings which are to be coated only in certain areas with films, possibly different films.

Figure 6:
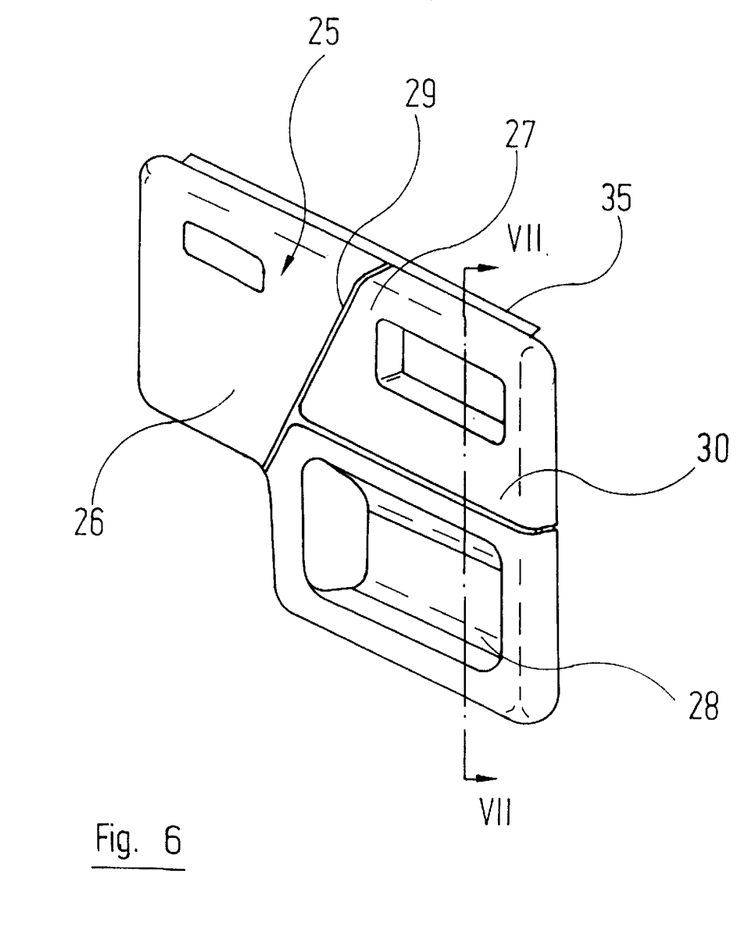
FIG. 6: the perspective view of a complicated plastic moulding.
Figure 7:
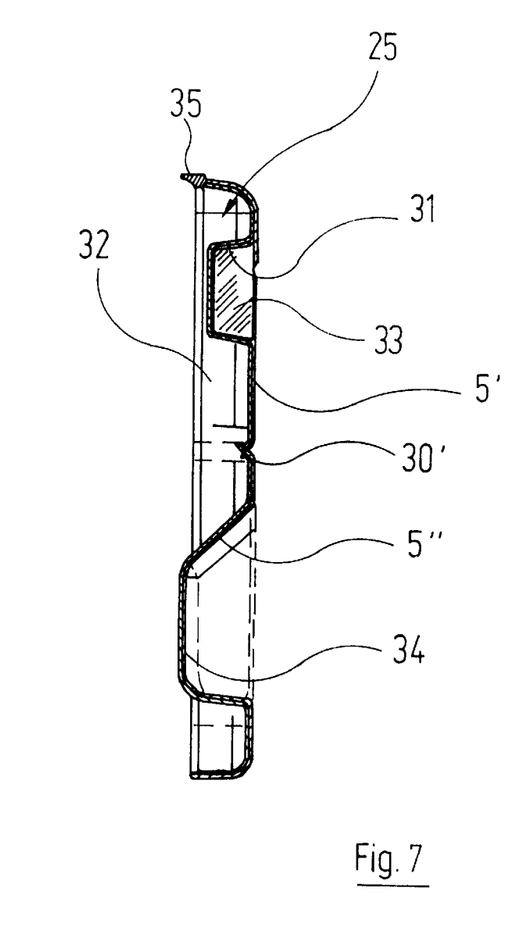
FIG. 7: a vertical section according to the line VII—VII of FIG. 6 on a somewhat enlarged scale.

An example of a plastic moulding of this type is the panelling for the inside of an automobile door 25 depicted in FIGS. 6 and 7. The implementation example depicted has three fields 26, 27,28 which are delimited from one another by groove like separation seams 29, 30. The field 26 remains without any film lamination and is painted in a later operation. The field 27 contains foam padding 33 in a recess 31 of the plastic support 32. The entire field 27 including the foam padding 33 is laminated with a film 5' of a first colour. The third field 28 finally includes a storage compartment 34 and is laminated in its entirety, including the walls of the storage compartment, with a film 5" of a second colour.

Finally a sealing lip 35 is sprayed on to the whole upper edge of the door panelling which is depicted.

Figure 8:
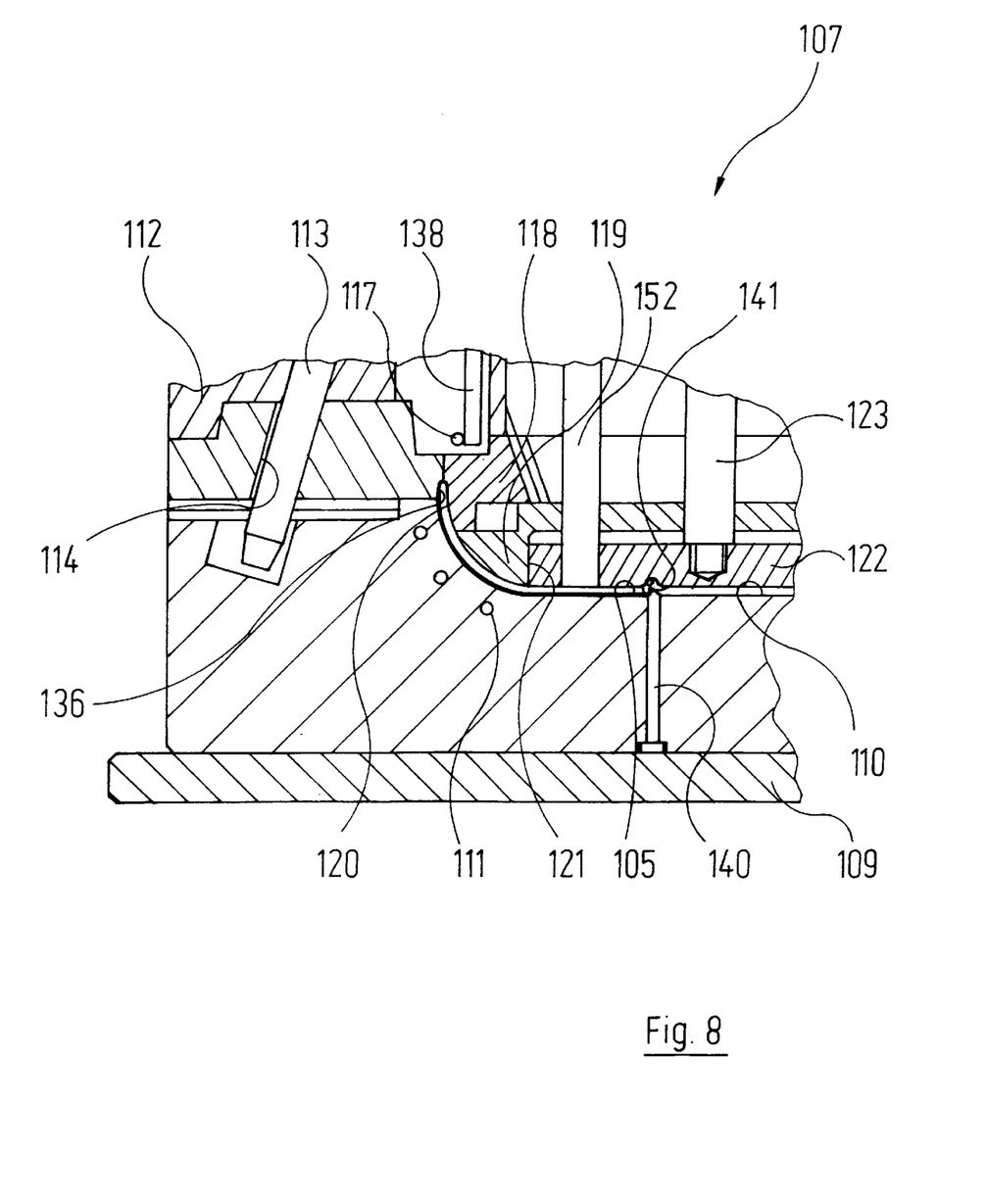
FIG. 8: a section, similar to FIGS. 2 to 5, through a second implementation example of a device for manufacture of film laminated plastic mouldings.

For manufacture of a complicated plastic moulding of this type the device depicted in FIGS. 2 to 5 requires certain modifications of which one is depicted in FIG. 8.

Since the implementation example of FIG. 8 corresponds to a great degree to those of FIGS. 2 to 5, the corresponding parts are indicated by the same reference number plus 100. In FIG. 8 the base plate 102, on which the matrix 108 is mounted with the vacuum channels 111, can thus be recognised. An outer slide 115, an inner slide 118 and a mould ring move vertically back and forth together with the mould top part 112. A pressure plate 122 may be moved separately vertically in a middle recess 121 of the mould ring 119 for which a pressure rod 123 is provided.

The outer slide 115 is moved horizontally back and forth resting on the matrix 108 with the vertical motion of the mould top part 112 by the guide pin 113 fixed diagonally in the mould top part 112 which penetrates the diagonally arranged through bore 114 of the outer slide 115. The inner slide by contrast has its own actuator device, which is not depicted in the illustration and which sees to the movement of the inner slide 118 in a horizontal direction.

The heating frame 118 with the electrical heating coil 117 may also be recognised in FIG. 8.

In FIG. 8 the sectional plane is laid out differently from FIGS. 2 to 5; for that reason it is not the needle valve nozzle 24 which can be recognised in FIG. 8 but an ejector 152 which serves for ejection of the completed plastic moulding.

Differences between the implementation example of FIG. 8 and those according to FIGS. 2 to 5 may be seen above all from the following:

The plastic film 105, whose contour has already been adapted to the final shape of the plastic moulding which is to be manufactured, no longer extends over the entire surface of the plastic moulding but ends at a point in the mould cavity 110 whose course corresponds to the separation seam (e.g. 30 in FIGS. 6 and 7). At this point a vertically movable steel punch 140 penetrates the matrix 108 whose edge which extends into the mould cavity 110 imitates the separation seam 30 which is to be produced.

Lugs 141, which project into the mould cavity 110 and which are slightly displaced laterally with respect to the position of the steel punch 140, are formed in a corresponding manner on the underside of the pressure plate 122.

The mode of functioning of the device depicted in FIG. 8 corresponds completely to those according to FIGS. 2 to 5 with the single exception, already mentioned, that the film 105 covers only part of the plastic moulding which is to be manufactured. The inner edge of the film 105 which ends up lying in the separation seam 30 of the plastic moulding which is to be manufactured is clamped firmly, during the final moulding process and solidification, between the punch 140 and the lugs 141 and thereby fixed in place. At the same time the prominent separation seam 30 between the individual fields of the plastic moulding which is strived for arises through the shape of the punch 140.

For the manufacture of plastic mouldings which are to contain foam padding 33, as is depicted in FIG. 7, the device requires a further modification which is however not depicted in the illustration.

In the manufacture of a plastic moulding of this type matters proceed such that the film 5 is again, if necessary after a preparatory deep drawing process, laid into the matrix of the device whereby the plastic padding 33 is already fixed on to the inner surface of the plastic film 5'. The different manufacturing steps now run according to FIGS. 2 to 5. However, in order to prevent the foam padding 33 being compressed during the moulding process, an injection needle nozzle is provided which pierces the foam padding 33 and supplies it with gas with a regulated excess pressure. This gas excess pressure counteracts the refill pressure so that the foam padding remains stable in shape. After completion of the moulding process, the injection needle nozzle is again withdrawn and thereby at the same time provides a route by which the injected gas can escape. The foam padding which wag previously hardened by the gas pressure is now once again elastic.

Figure 9:
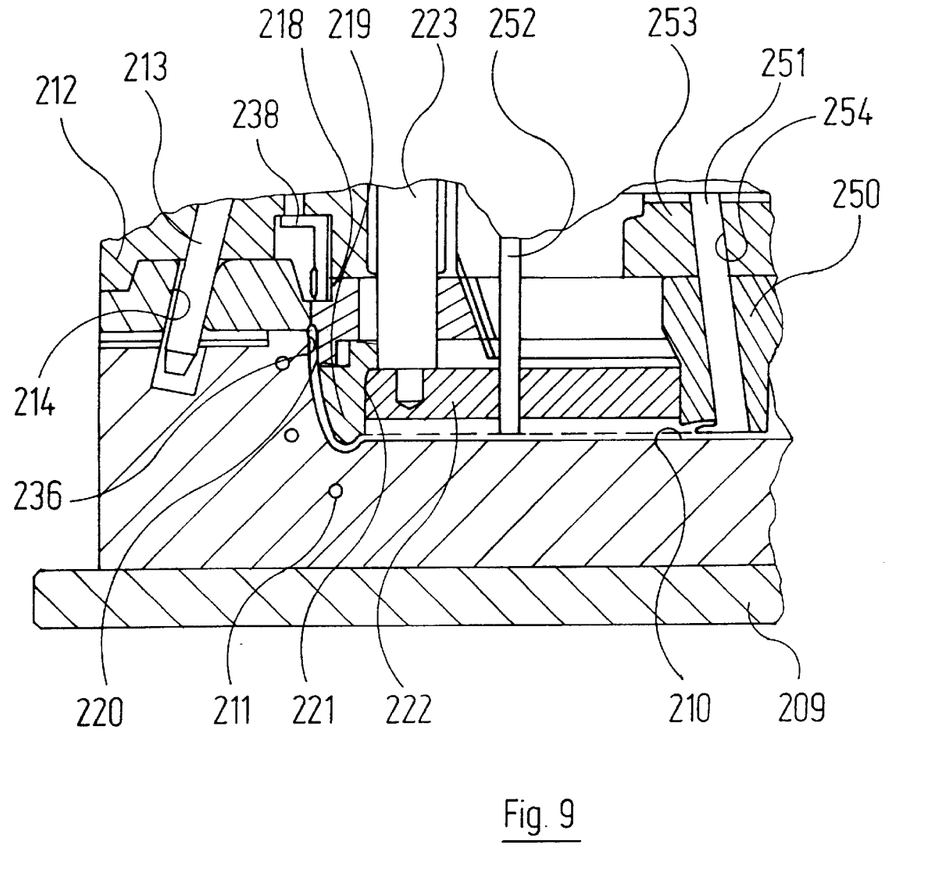
FIG. 9: a section, similar to FIGS. 2 to 5, through a third implementation example of a device for manufacture of film laminated plastic mouldings.

In FIG. 9 a further implementation example of a device for the manufacture of plastic mouldings is depicted which corresponds to a great extent to that according to FIGS. 2 to 5. Corresponding parts are therefore indicated with the same reference numbers plus 200.

The implementation example of FIG. 9 differs from the above described implementation examples through an additional slide 250 which in the lower region of its outer contour imitates a hook like projection which should be formed on the plastic moulding. This serves for clipping to further objects about which it is not necessary to go into details. The slide 250 is pierced in a diagonal direction by a punch 251 which in its lower region helps determine the contour of the plastic moulding in the area of the hook like projection. The punch 251 is introduced into a diagonal through bore 254 of a vertically movable part 253 such that the vertical motion of this part 253 is converted into a lateral movement of the slide 250. If in particular the part 253 is transported upwards the slide 250 moves to the right through which the plastic moulding is demoulded.

In FIG. 9 an ejector is furthermore again depicted which is moved vertically for ejection of the completed plastic moulding. In order to be able to keep the number of such ejectors low, the punch 251 of the slide 250 may be moved together with the ejector or ejectors 252 and thus itself takes over the function of such an ejector.

What is claimed is:

1. An improved method of manufacturing film laminated plastic molding having a fold around at least one edge and including a foam padding, wherein the film is first molded into its intended final form and a melt of materials forming a plastic support is applied only thereafter to the already molded film and its fold and is allowed to solidify there, where the improvement comprises the steps of:

a) affixing the foam padding to the film; and b) temporarily hardening said foam padding from undesirable compression by the injection therein of a gas during introduction of the melt of the material forming the plastic support.

2. An improved method of manufacturing a film laminated plastic molding having a fold around at least one edge and including a flexible foam padding, wherein the film is first molded into its intended final form and a melt of materials forming a plastic support is applied only thereafter to solidify there, wherein the improvement comprises the steps of:

forming a mold cavity in a matrix which partially imitates the intended final shape to which said plastic molding is to be manufactured;

laying down the film inserted into the mold cavity onto the wall of the mold cavity;

applying the melt of the materials forming the plastic support to the film via at least one nozzle;

pressing the melt into a fold of the film and forming the plastic support into its intended final shape; and heating at least one edge of the film disposed to project over said mold cavity of the matrix.

3. The improved method of claim 2 further including the steps of fixing foam padding to the film; and temporarily reinforcing the foam padding from undesirable compression during the step of applying the melt of the materials forming the plastic support.

4. The improved method of claim 2 further including the steps of fixing foam padding to the film; and preventing the foam padding from being compressed during the molding process.

5. The improved method of claim 4 wherein the step of preventing the foam padding from being compressed includes the steps of:

piercing the foam padding with an injection needle nozzle and supplying the foam padding with pressurized gas to counteract pressure during the applying the melt step.

6. The improved method of claim 2, wherein the step of temporarily reinforcing the foam padding includes the steps of:

piercing the foam padding with an injection needle nozzle and supplying the foam padding with pressured gas to counteract pressure during the applying the melt step.

7. The improved method of claim 5, further including the steps of:

withdrawing the injection needle nozzle to allow the pressurized gas to escape.

8. The improved method of claim 2 further including the steps of:

fixing flexible foam padding to the film; and temporarily hardening the foam padding during the applying the melt step.

9. The improved method of claim 2 further including the steps of:

fixing flexible foam padding to the film; and temporarily building a counter pressure in the foam padding to oppose pressure of the melt of the materials forming the plastic support.

* * * * *